United States Patent
Arbuckle et al.

(10) Patent No.: US 10,671,073 B2
(45) Date of Patent: Jun. 2, 2020

(54) STATION KEEPING SYSTEM AND METHOD

(71) Applicant: Brunswick Corporation, Mettawa, IL (US)

(72) Inventors: Jason S. Arbuckle, Horicon, WI (US); Steven J. Andrasko, Oshkosh, WI (US); David M. Van Buren, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 231 days.

(21) Appl. No.: 15/887,372

(22) Filed: Feb. 2, 2018

(65) Prior Publication Data
US 2018/0231980 A1 Aug. 16, 2018

Related U.S. Application Data

(60) Provisional application No. 62/459,295, filed on Feb. 15, 2017.

(51) Int. Cl.
*G05D 1/02* (2020.01)
*G01C 23/00* (2006.01)
(Continued)

(52) U.S. Cl.
CPC ........... *G05D 1/0206* (2013.01); *B63H 25/04* (2013.01); *B63H 25/42* (2013.01); *B63J 99/00* (2013.01);
(Continued)

(58) Field of Classification Search
CPC ...... G05D 1/0206; G05D 1/0208; G05D 1/10; G05D 1/12; G05D 3/00; B63H 25/00;
(Continued)

(56) References Cited

U.S. PATENT DOCUMENTS 2,360,361 A * 10/1944 Mountbatten ........... B63B 49/00
114/144 E
3,145,683 A * 8/1964 Kolb ..................... G05D 1/0208
114/144 B
(Continued)

FOREIGN PATENT DOCUMENTS

EP 423901 4/1991
EP 816962 7/1998
(Continued)

OTHER PUBLICATIONS

Poorman et al., Multilayer Control System and Method for Controlling Movement of a Marine Vessel, Unpublished U.S. Appl. No. 11/965,583, filed Dec. 27, 2007.
(Continued)

*Primary Examiner* — Richard A Goldman
(74) *Attorney, Agent, or Firm* — Andrus Intellectual Property Law, LLP (57) ABSTRACT

A method for maintaining a marine vessel at a global position and/or heading includes receiving measurements related to vessel attitude and estimating water roughness conditions based on the measurements. A difference between the vessel's actual global position and the target global position and/or a difference between the vessel's actual heading and the target heading are determined. The method includes calculating a desired linear velocity based on the position difference and/or a desired rotational velocity based on the heading difference. The vessel's actual linear velocity and/or actual rotational velocity are filtered based on the roughness conditions. The method includes determining a difference between the desired linear velocity and the filtered actual linear velocity and/or a difference between the desired rotational velocity and the filtered actual rotational velocity. The method also includes calculating vessel move-
(Continued)

ments that will minimize the linear velocity difference and/or rotational velocity difference and carrying out the calculated movements.

20 Claims, 8 Drawing Sheets

(51) Int. Cl.
| | |
|---|---|
| B63J 99/00 | (2009.01) |
| B63H 25/04 | (2006.01) |
| B63H 25/42 | (2006.01) |
| B63H 25/02 | (2006.01) |
| B63B 79/00 | (2020.01) |

(52) U.S. Cl.
CPC ........... *G01C 23/00* (2013.01); *G05D 1/0208* (2013.01); *B63B 79/00* (2020.01); *B63H 2025/026* (2013.01); *B63H 2025/045* (2013.01); *B63H 2025/425* (2013.01)

(58) Field of Classification Search
CPC ........ B63H 25/02; B63H 25/06; B63H 25/04; B63H 25/42; B63H 2025/045; B63H 2025/425; G01C 23/00; B63J 99/00; B63J 2099/008
USPC .................. 701/1, 21, 466, 300, 36, 49, 518
See application file for complete search history.

(56) References Cited

U.S. PATENT DOCUMENTS

| | | | |
|---|---|---|---|
| 3,177,348 A * | 4/1965 | Daniloff | G01S 1/02 |
| | | | 701/3 |
| 3,187,704 A | 6/1965 | Shatto, Jr. et al. | |
| 3,688,252 A | 8/1972 | Thompson | |
| 3,715,571 A | 2/1973 | Braddon | |
| 3,771,483 A | 11/1973 | Bond | |
| 4,253,149 A | 2/1981 | Cunnungham et al. | |
| 4,257,718 A * | 3/1981 | Rosa | B63B 35/03 |
| | | | 405/167 |
| 4,428,052 A | 1/1984 | Robinson et al. | |
| 4,513,378 A | 4/1985 | Antkowiak | |
| 4,769,773 A | 9/1988 | Shatto, Jr. | |
| 4,939,661 A | 7/1990 | Barker et al. | |
| 4,975,709 A | 12/1990 | Koike | |
| 5,152,239 A | 10/1992 | Hossfield et al. | |
| 5,172,324 A | 12/1992 | Knight | |
| 5,179,905 A | 1/1993 | Hossfield et al. | |
| 5,202,835 A | 4/1993 | Knight | |
| 5,331,558 A * | 7/1994 | Hossfield | G05D 1/0206 |
| | | | 114/144 RE |
| 5,362,263 A | 11/1994 | Petty | |
| 5,386,368 A | 1/1995 | Knight | |
| 5,390,125 A | 2/1995 | Sennott et al. | |
| 5,491,636 A | 2/1996 | Robertson et al. | |
| 5,735,718 A | 4/1998 | Ekwall | |
| 5,884,213 A | 3/1999 | Carlson | |
| 6,059,226 A | 5/2000 | Cotton et al. | |
| 6,092,007 A | 7/2000 | Cotton et al. | |
| 6,230,642 B1 | 5/2001 | McKenney et al. | |
| 6,234,853 B1 | 5/2001 | Lanyi et al. | |
| 6,273,771 B1 | 8/2001 | Buckley et al. | |
| 6,377,889 B1 | 4/2002 | Soest | |
| 6,446,003 B1 | 9/2002 | Green et al. | |
| 6,485,341 B1 | 11/2002 | Lanyi et al. | |
| 6,604,479 B2 | 8/2003 | McKenney et al. | |
| 6,611,737 B1 | 8/2003 | El-Tahan et al. | |
| 6,678,589 B2 | 1/2004 | Robertson et al. | |
| 6,848,382 B1 | 2/2005 | Bekker | |
| 6,995,527 B2 | 2/2006 | Depasqua | |
| 7,140,315 B2 | 11/2006 | Okuyama | |
| 7,267,068 B2 | 9/2007 | Bradley et al. | |
| 7,268,703 B1 | 9/2007 | Kabel et al. | |
| 7,305,928 B2 | 12/2007 | Bradley et al. | |
| 7,366,593 B2 | 4/2008 | Fujimoto et al. | |
| 7,398,742 B1 | 7/2008 | Gonring | |
| 7,416,458 B2 | 8/2008 | Suemori et al. | |
| 7,467,595 B1 | 12/2008 | Lanyi et al. | |
| 7,476,134 B1 | 1/2009 | Fell et al. | |
| 7,538,511 B2 | 5/2009 | Samek | |
| 7,561,886 B1 * | 7/2009 | Gonring | G01C 1/00 |
| | | | 340/514 |
| 7,577,526 B2 | 8/2009 | Kim et al. | |
| 7,630,798 B2 | 8/2009 | Mossman et al. | |
| 7,727,036 B1 | 6/2010 | Poorman et al. | |
| 8,050,630 B1 | 11/2011 | Arbuckle | |
| 8,082,100 B2 * | 12/2011 | Grace | A01K 91/08 |
| | | | 701/300 |
| 8,145,370 B2 | 3/2012 | Borrett | |
| 8,145,371 B2 | 3/2012 | Rae et al. | |
| 8,150,621 B1 | 4/2012 | Phillips et al. | |
| 8,155,811 B2 | 4/2012 | Noffsinger et al. | |
| 8,215,252 B1 | 7/2012 | Chun | |
| 8,265,812 B2 | 9/2012 | Pease | |
| 8,326,472 B2 * | 12/2012 | Igarashi | B63H 25/42 |
| | | | 701/21 |
| 8,417,399 B2 * | 4/2013 | Arbuckle | B63B 39/00 |
| | | | 701/1 |
| 8,478,464 B2 | 7/2013 | Arbuckle et al. | |
| 8,480,445 B2 | 7/2013 | Morvillo | |
| 8,510,028 B2 | 8/2013 | Grace et al. | |
| 8,515,660 B2 | 8/2013 | Grace et al. | |
| 8,515,661 B2 | 8/2013 | Grace et al. | |
| 8,527,192 B2 | 9/2013 | Grace et al. | |
| 8,543,324 B2 | 9/2013 | Grace et al. | |
| 8,645,012 B2 | 2/2014 | Salmon et al. | |
| 8,694,248 B1 | 4/2014 | Arbuckle et al. | |
| 8,761,976 B2 | 6/2014 | Salmon et al. | |
| 8,777,681 B1 | 7/2014 | McNalley et al. | |
| 8,807,059 B1 | 8/2014 | Samples et al. | |
| 8,808,041 B2 * | 8/2014 | Hine | B63H 19/02 |
| | | | 440/9 |
| 8,831,868 B2 | 9/2014 | Grace et al. | |
| 8,924,054 B1 * | 12/2014 | Arbuckle | B63H 21/21 |
| | | | 701/21 |
| 9,039,468 B1 * | 5/2015 | Arbuckle | B63H 21/213 |
| | | | 440/1 |
| 9,110,467 B2 | 8/2015 | Yuet et al. | |
| 9,132,900 B2 | 9/2015 | Salmon et al. | |
| 9,132,903 B1 | 9/2015 | Gable et al. | |
| 9,162,743 B2 | 10/2015 | Grace et al. | |
| 9,248,898 B1 | 2/2016 | Kirchhoff et al. | |
| 9,359,057 B1 | 6/2016 | Arbuckle et al. | |
| 9,377,780 B1 | 6/2016 | Arbuckle et al. | |
| 9,676,464 B2 | 6/2017 | Johnson et al. | |
| 9,733,645 B1 | 8/2017 | Andrasko et al. | |
| 9,904,293 B1 * | 2/2018 | Heap | G05D 1/12 |
| 9,927,520 B1 | 3/2018 | Ward et al. | |
| 9,952,595 B2 | 4/2018 | Arbuckle et al. | |
| 10,095,232 B1 * | 10/2018 | Arbuckle | G05D 1/0208 |
| 2003/0191562 A1 * | 10/2003 | Robertson | B63H 25/42 |
| | | | 701/21 |
| 2004/0221787 A1 | 11/2004 | McKenney et al. | |
| 2005/0092225 A1 * | 5/2005 | Kaji | B63H 25/04 |
| | | | 114/144 R |
| 2005/0164569 A1 | 7/2005 | Kaji et al. | |
| 2005/0170713 A1 | 8/2005 | Okuyama | |
| 2006/0089794 A1 | 4/2006 | Depasqua | |
| 2006/0116796 A1 * | 6/2006 | Fossen | G05B 23/0256 |
| | | | 701/21 |
| 2007/0017426 A1 | 1/2007 | Kaji et al. | |
| 2007/0032923 A1 | 2/2007 | Mossman et al. | |
| 2007/0089654 A1 * | 4/2007 | Bradley | B63H 21/22 |
| | | | 114/10 |
| 2007/0089660 A1 * | 4/2007 | Bradley | B63H 21/22 |
| | | | 114/144 A |
| 2007/0162207 A1 * | 7/2007 | Shimo | B63H 25/04 |
| | | | 701/42 |
| 2007/0178779 A1 | 8/2007 | Takada et al. | |
| 2007/0203623 A1 | 8/2007 | Saunders et al. | |
| 2007/0233389 A1 | 10/2007 | Stephens | |

(56) References Cited

U.S. PATENT DOCUMENTS

| | | |
|---|---|---|
| 2008/0027597 A1* | 1/2008 | Barrett .................. B63H 25/04 701/21 |
| 2009/0037040 A1 | 2/2009 | Salmon et al. |
| 2009/0076671 A1 | 3/2009 | Mizutani |
| 2009/0171520 A1 | 7/2009 | Kaji |
| 2009/0276148 A1 | 11/2009 | Ardvisson |
| 2010/0023192 A1* | 1/2010 | Rae ...................... B63H 11/107 701/21 |
| 2010/0070124 A1 | 3/2010 | Yeager et al. |
| 2010/0109944 A1 | 5/2010 | Whitehead et al. |
| 2011/0153126 A1* | 6/2011 | Arbuckle .............. B63H 21/22 701/21 |
| 2011/0288714 A1 | 11/2011 | Flohr et al. |
| 2012/0129410 A1 | 5/2012 | Tyers |
| 2012/0130570 A1* | 5/2012 | Pease .................... B63H 25/04 701/21 |
| 2012/0248259 A1 | 10/2012 | Page et al. |
| 2013/0080044 A1 | 3/2013 | Tyers et al. |
| 2013/0297104 A1 | 11/2013 | Tyers et al. |
| 2014/0114509 A1 | 4/2014 | Venables et al. |
| 2014/0362661 A1 | 12/2014 | Muijzert et al. |
| 2015/0089427 A1 | 3/2015 | Akuzawa |
| 2015/0277442 A1 | 10/2015 | Ballou |
| 2015/0321740 A1* | 11/2015 | Bradley .................. B63H 1/10 416/1 |
| 2015/0346730 A1* | 12/2015 | Stephens .............. G05D 1/0206 701/21 |
| 2016/0016651 A1 | 1/2016 | Anderson et al. |
| 2016/0039500 A1* | 2/2016 | Heyring ................. B63B 39/04 114/61.15 |
| 2016/0061980 A1 | 3/2016 | Tonchia et al. |
| 2016/0101838 A1 | 4/2016 | Kojima |
| 2016/0125739 A1 | 5/2016 | Stewart et al. |
| 2016/0246300 A1* | 8/2016 | Langford-Wood ........................ G05D 1/0206 |
| 2016/0252907 A1* | 9/2016 | Parkinson .............. B63H 25/04 701/21 |
| 2016/0299507 A1 | 10/2016 | Shah et al. |
| 2016/0334792 A1 | 11/2016 | Jopling |
| 2017/0205828 A1 | 7/2017 | Estabrook |
| 2017/0205829 A1 | 7/2017 | Tyers |
| 2017/0210449 A1 | 7/2017 | Frisbie et al. |
| 2017/0253314 A1* | 9/2017 | Ward ..................... B63H 25/04 |
| 2017/0255200 A1* | 9/2017 | Arbuckle .............. B63H 21/21 |
| 2017/0277189 A1* | 9/2017 | Johnson ................. G01S 15/025 |
| 2017/0349257 A1 | 12/2017 | Hara et al. |
| 2017/0365175 A1 | 12/2017 | Harnett |
| 2018/0015994 A1* | 1/2018 | Kishimoto ............. B63H 25/04 |
| 2018/0106619 A1* | 4/2018 | Johnson ................. G01C 21/18 |
| 2018/0231980 A1* | 8/2018 | Arbuckle ............... B63H 25/42 |
| 2018/0284815 A1* | 10/2018 | Cui ....................... G05D 1/0016 |
| 2019/0286169 A1* | 9/2019 | Cui ....................... G05D 1/101 |
| 2019/0359300 A1* | 11/2019 | Johnson ................. B63B 49/00 |

FOREIGN PATENT DOCUMENTS

| | | |
|---|---|---|
| EP | 2161542 | 3/2010 |
| EP | 2952994 | 12/2015 |
| GB | 1173442 | 12/1969 |
| JP | 58061097 | 4/1983 |
| JP | 05-203638 | 8/1993 |
| JP | 7223591 | 8/1995 |
| JP | 2926533 | 7/1997 |
| JP | 11-129978 | 5/1999 |
| JP | 2001-287697 | 10/2001 |
| JP | 2002-178990 | 6/2002 |
| JP | 2002173091 | 6/2002 |
| JP | 2003276677 | 10/2003 |
| JP | 200442884 | 2/2004 |
| JP | 2004355105 | 12/2004 |
| JP | 200546034 | 2/2005 |
| JP | 2005-200004 | 7/2005 |
| JP | 2006-137309 | 6/2006 |
| JP | 2006137309 | 6/2006 |
| JP | 2009-227035 | 10/2009 |
| JP | 2009-241738 | 10/2009 |
| JP | 2009-538782 | 11/2009 |
| JP | 2011128943 | 6/2011 |
| JP | 5042906 | 7/2012 |
| JP | 2012528417 | 11/2012 |
| JP | 5226355 | 7/2013 |
| JP | 2014065495 | 4/2014 |
| WO | WO 9205505 | 4/1992 |
| WO | WO 2006058400 | 6/2006 |
| WO | WO 2014033457 | 3/2014 |
| WO | WO 2016104031 | 6/2016 |
| WO | WO 2017095235 A1 | 6/2017 |

OTHER PUBLICATIONS

European Search Report issued in corresponding European Application No. 18156268.7, dated Jun. 15, 2018.
Arbuckle et al., "Station Keeping Methods," Unpublished U.S. Appl. No. 15/445,031, filed Feb. 28, 2017.
Gonring, "System and Method for Controlling Course of a Marine Vessel," Unpublished U.S. Appl. No. 15/415,095, filed Jan. 25, 2017.
Arbuckle et al., "Methods for Positioning Marine Vessels," Unpublished U.S. Appl. No. 16/028,019, filed Jul. 5, 2018.

* cited by examiner

STATION KEEPING SYSTEM AND METHOD

CROSS-REFERENCE TO RELATED APPLICATION

The present application claims priority to and the benefit of U.S. Provisional Application Ser. No. 62/459,295, filed Feb. 15, 2017, which is hereby incorporated by reference herein in its entirety.

FIELD

The present disclosure relates to automatic positioning systems and methods for marine vessels.

BACKGROUND

U.S. Pat. No. 6,273,771, which is hereby incorporated by reference herein, discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,305,928, which is hereby incorporated by reference herein, discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

U.S. Pat. No. 8,478,464, which is hereby incorporated by reference herein, discloses systems and methods for orienting a marine vessel to enhance available thrust in a station keeping mode. A control device having a memory and a programmable circuit is programmed to control operation of a plurality of marine propulsion devices to maintain orientation of a marine vessel in a selected global position. The control device is programmed to calculate a direction of a resultant thrust vector associated with the plurality of marine propulsion devices that is necessary to maintain the vessel in the selected global position. The control device is programmed to control operation of the plurality of marine propulsion devices to change the actual heading of the marine vessel to align the actual heading with the thrust vector.

Unpublished U.S. patent application Ser. No. 15/425,184, filed Feb. 6, 2017, which is incorporated by reference herein, discloses a method for maintaining a marine vessel propelled by a marine propulsion device in a selected position, including determining a current global position of the marine vessel and receiving a signal command to maintain the current global position. The current global position is stored as a target global position in response to receiving the signal command. A subsequent global position of the marine vessel is determined and a position error difference between the subsequent global position and the target global position is determined. The method includes determining marine vessel movements required to minimize the position error difference, and causing the marine propulsion device to produce a thrust having a magnitude, a direction, and an angle calculated to result in achievement of the required marine vessel movements. At least one of timing and frequency of discontinuity of thrust production is controlled while the position error difference is minimized.

Other patents describing various station keeping features and related system and method improvements include: U.S. Pat. Nos. 7,267,068; 8,050,630; 8,417,399; 8,694,248; 8,807,059; 8,924,054; 9,132,903; 9,377,780; 9,733,645; and unpublished U.S. patent application Ser. No. 14/807,217, filed Jul. 23, 2015. Each of these patents and applications is hereby incorporated by reference herein.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a method for maintaining a marine vessel at at least one of a target global position and a target heading in a body of water is carried out by a control module. The method includes receiving measurements related to an attitude of the marine vessel and estimating roughness conditions of the body of water based on the attitude measurements. The method includes determining at least one of a difference between an actual global position of the marine vessel and the target global position and a difference between an actual heading of the marine vessel and the target heading. The method then includes calculating at least one of a desired linear velocity based on the position difference and a desired rotational velocity based on the heading difference. Based on the roughness conditions, the control module filters at least one of an actual linear velocity of the marine vessel and an actual rotational velocity of the marine vessel. The method includes determining at least one of a difference between the desired linear velocity and the filtered actual linear velocity and a difference between the desired rotational velocity and the filtered actual rotational velocity. The method also includes calculating marine vessel movements that will minimize the at least one of the linear velocity difference and the rotational velocity difference. Next, the method includes operating a propulsion system of the marine vessel to carry out the calculated marine vessel movements.

A system for maintaining a marine vessel at at least one of a preselected global position and a preselected heading comprises a control module in signal communication with a propulsion system of the marine vessel. A pitch sensor provides vessel pitch measurements to the control module, and a roll sensor provides vessel roll measurements to the control module. Additionally, a heading sensor provides a measured heading of the marine vessel to the control module, and a position sensor provides a measured global position of the marine vessel to the control module. The control module determines at least one of a difference between the measured global position and the preselected global position and a difference between the measured heading and the preselected heading. The control module then calculates at least one of a desired linear velocity based on the position difference and a desired rotational velocity based on the heading difference. Based on the pitch measurements and the roll measurements, the control module filters at least one of an actual linear velocity of the marine vessel and an actual rotational velocity of the marine vessel. The control module determines at least one of a difference between the desired linear velocity and the filtered actual linear velocity and a difference between the desired rotational velocity and the filtered actual rotational velocity. The control module then calculates marine vessel movements that will minimize the at least one of the linear velocity difference and the rotational velocity difference and causes the marine propulsion system to operate to carry out the calculated marine vessel movements.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

The system and method of the present disclosure enhance a marine vessel's station-keeping, auto-heading, and/or waypoint tracking algorithm such that recurring disturbances to the measured position and/or heading of the marine vessel are filtered out under rough sea conditions. The marine vessel's propulsion system is therefore less busy correcting perceived back-and-forth or side-to-side errors and is activated to correct net position and/or heading errors when necessary.

Figure 1:
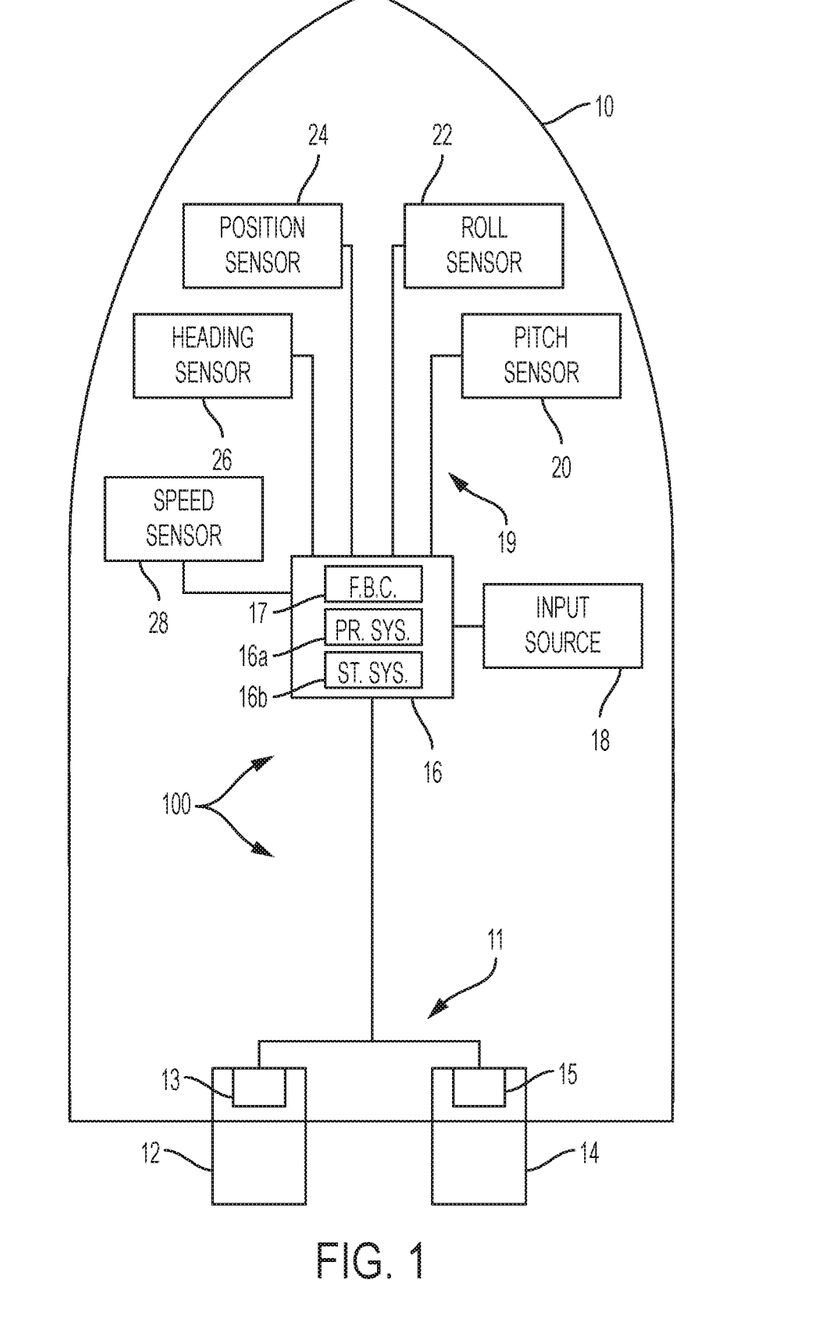
FIG. 1 illustrates a schematic of a marine vessel according to the present disclosure

FIG. 1 schematically depicts a marine vessel 10 including a system 100 for maintaining the marine vessel 10 at at least one of a preselected (or target) global position and a preselected (or target) heading. The marine vessel 10 includes two marine propulsion devices 12, 14, although fewer or more propulsion devices could be provided. The propulsion devices 12, 14 can be any type of marine propulsion device, such as for example, pod drives, sterndrives, outboards, jet drives, and/or thrusters. The system includes a control module 16 in signal communication with a propulsion system 11 of the marine vessel 10, which includes the propulsion devices 12, 14. The control module 16 sends signals to control the magnitude of thrust produced by the propulsion devices 12, 14 in order to propel the marine vessel 10, as will be described further herein below. The position of the marine vessel 10 can be controlled either by positioning the propulsion devices 12, 14 themselves (such as with outboard motors or sterndrives) or by positioning a rudder of the marine vessel 10 to change the direction of the marine vessel 10.

Each marine propulsion device 12, 14 is associated with a respective power transmission mechanism 13, 15. The power transmission mechanisms 13, 15 may each comprise a single shaft, gear, or clutch, or may comprise a series of shafts, gears, clutches, etc. that transmit power from a prime mover, such as an engine or a motor located in the propulsion device 12, 14 or aboard the vessel 10, to a rotating thrust-producing device, such as a propeller, impeller, propulsor, or the like. The power transmission mechanisms 13, 15 may be transmissions that are shiftable to forward, neutral, and reverse positions, or may be designed such that they are capable only of rotating or not rotating, for example if they are engaged or not engaged with the prime mover or if the prime mover itself is turned on or off.

The precise propulsion devices and apparatuses by which the marine vessel 10 can change its direction are not limiting on the scope of the present disclosure. For example, although the propulsion devices 12, 14 will be described herein below as being powered by engines, the propulsion devices 12, 14 could instead be propelled by electric motors. For purposes of simplicity, the control module 16 will be described as controlling the direction and magnitude of thrust of the propulsion devices 12, 14, although it should be understood that the control module 16 could alternatively control the positon of a rudder, reversing bucket, trim tab, or the like in order to control the direction of the marine vessel 10.

The control module 16 may be communicatively connected to an input source 18, such as for example a touch screen, that allows an operator of the marine vessel 10 to operate the vessel 10 in one or more operating modes, including but not limited to a station keeping mode, an auto-heading mode, or a waypoint tracking mode, which are generally known in the art. The input source 18 could alternatively be a smart phone or tablet, a PDA, a gauge, a keyboard, a keypad, a mouse, a button, a joystick, or any number of other input devices and/or peripherally connectable devices suitable for providing information to the control module 16.

The system 100 may also include a pitch sensor 20 that provides vessel pitch measurements to the control module 16, a roll sensor 22 that provides vessel roll measurements to the control module 16, a heading sensor 26 that provides a measured (actual) heading of the marine vessel 10 to the control module 16, and a position sensor 24 that provides a measured (actual) global position of the marine vessel 10 to the control module 16. The control module 16 may also be communicatively connected to a vessel speed sensor 28. The pitch sensor 20 and the roll sensor 22 can be separate devices, or can be combined in a motion reference unit (MRU) that includes accelerometers and MEMS angular rate gyros. The heading sensor 26 can be, for example, a solid state compass or a flux gate compass, although a gyroscope could also be used. In one example, the heading sensor 26 is an inertial measurement unit (IMU), which may have a solid state, rate gyro electronic compass that detects the direction of the earth's magnetic field using solid state magnetometers and indicates the vessel heading relative to magnetic north. Additionally, solid state accelerometers and angular rate sensors in the IMU may be provided to sense the vessel's attitude and rate of turn. The position sensor 24, heading sensor 26, and speed sensor 28 can be combined in a global positioning system (GPS) receiver that provides the location (latitude and longitude), speed (speed over ground), and direction (course over ground) of the marine vessel 10. In one example, the pitch sensor 20, the roll sensor 22, the position sensor 24, the heading sensor, 26, and the speed sensor 28 are provided in a single unit known as an attitude and heading reference system (AHRS) 19. An AHRS 19 provides 3D orientation of the marine vessel 10 by integrating gyroscopic measurements, accelerometer data, and magnetometer data.

The control module 16 is programmable and includes a processing system 16a and a storage system 16b. The control module 16 can be located anywhere on the vessel 10 and/or located remote from the vessel 10 and can communicate with various components of the vessel 10 via a peripheral interface and wired and/or wireless links, as will be explained further herein below. Although FIG. 1 shows one control module 16, the vessel 10 can include more than one control module. Portions of the method disclosed herein below can be carried out by a single control module or by several separate control modules. For example, the system can have a control module located at or near a helm of the vessel 10 and can also have control module(s) located at or near the propulsion devices 12, 14. If more than one control module is provided, each can control operation of a specific device or sub-system on the vessel 10.

In some examples, the control module 16 may include a computing system that includes the processing system 16a, storage system 16b, software, and input/output (I/O) interfaces for communicating with peripheral devices. The systems may be implemented in hardware and/or software that carries out a programmed set of instructions. For example, the processing system 16a loads and executes software from the storage system 16b, such as software programmed with a station keeping method, a waypoint tracking method, and/or an auto-heading method, which directs the processing system 16a to operate as described herein below in further detail. The computing system may include one or more processors, which may be communicatively connected. The processing system 16a can comprise a microprocessor, including a control unit and a processing unit, and other circuitry, such as semiconductor hardware logic, that retrieves and executes software from the storage system 16b. The processing system 16a can be implemented within a single processing device but can also be distributed across multiple processing devices or sub-systems that cooperate according to existing program instructions. The processing system 16a can include one or many software modules comprising sets of computer executable instructions for carrying out various functions as described herein.

As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

The storage system 16b can comprise any storage media readable by the processing system and capable of storing software. The storage system can include volatile and non-volatile, removable and non-removable media implemented in any method or technology for storage of information, such as computer-readable instructions, data structures, software modules, or other data. The storage system 16b can be implemented as a single storage device or across multiple storage devices or sub-systems. The storage system 16b can include additional elements, such as a memory controller capable of communicating with the processing system. Non-limiting examples of storage media include random access memory, read-only memory, magnetic discs, optical discs, flash memory, virtual and non-virtual memory, various types of magnetic storage devices, or any other medium which can be used to store the desired information and that may be accessed by an instruction execution system. The storage media can be a transitory storage media or a non-transitory storage media such as a non-transitory tangible computer readable medium.

The control module 16 communicates with one or more components on the vessel 10 via the I/O interfaces and a communication link, which can be a wired or wireless link. In one example, the communication link is a controller area network (CAN) bus, as described in U.S. Pat. No. 6,273,771, which was incorporated by reference herein above, but it should be understood that other types of links could be used.

Figure 5:
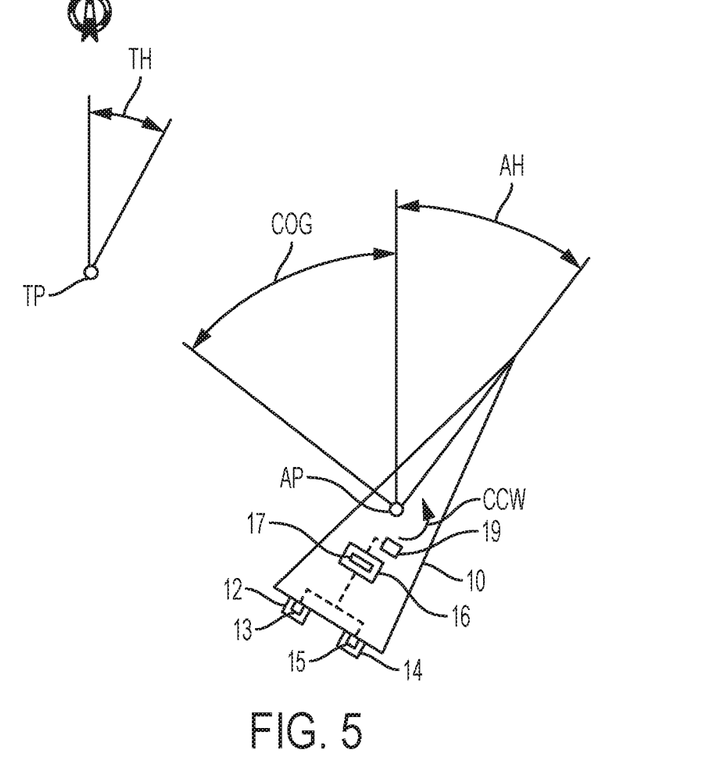
FIG. 5 is a schematic for purposes of illustrating a method for maintaining a marine vessel at a target global position and a target heading.

Referring to FIG. 5, in a station keeping mode, the marine vessel 10 can be maintained in a single global position (defined by latitude and longitude) and at a predetermined heading by way of an algorithm that controls the vessel's propulsion devices 12, 14 to counteract the effects of wind, waves, current, etc. that would tend to move the vessel 10 off this location and/or to a new heading. In essence, the propulsion devices 12, 14 are controlled to maintain the vessel 10 at a virtual anchor point. The control module 16, which controls direction and magnitude of thrust and angular orientation of the propulsion devices 12, 14, acts as a virtual joystick and calculates left/right, fore/aft, and yaw commands required to drive the vessel's position error and heading error to zero.

An example of the inputs to the control module's calculations while the vessel 10 is in a station keeping mode is shown in FIG. 5. In this example, the actual, measured global position (AP) of a preselected point on the vessel 10, as determined by a GPS receiver in the AHRS 19, is not equal to a predetermined target global position (TP), and thus the control module 16 will calculate a course over ground (COG) that the vessel 10 must travel to reach the target global position TP. Additionally, a predetermined target heading (TH) is, for example, 27 degrees from north, while the actual, measured heading (AH) read from a compass or an inertial measurement unit (IMU) is, for example, 35.8 degrees from north. Using a station keeping algorithm, the control module 16 will therefore determine that a counterclockwise yaw movement (arrow CCW) of, in this example, 8.8 degrees is required to return the vessel 10 to the target heading TH. The control module 16 may also calculate target velocities at which the marine vessel 10 is to rotate and translate to achieve the target heading and position, which ensures that the vessel 10 moves at a predictable, proportional rate back to the targets.

The control module 16 determines when and how much corrective action to take according to a three-dimensional (left/right, fore/aft, and yaw) proportional, integral, and derivative (PID) control algorithm performed by a feedback controller 17 of the control module 16. The integral term allows the control system to reject constant and slowly varying disturbances (e.g., current) while maintaining near-zero position error. The proportional and derivative terms handle any quickly varying disturbances, such as gusting winds or waves. The integral term is also considered to have memory and can take time to increase or decrease, especially if the disturbance forces grow. The PID feedback controller 17 computes a desired force in the forward/back and left/right directions with reference to the marine vessel 10, along with a desired yaw moment relative to the marine vessel 10, in order to null the error elements. The computed force and moment elements are then transmitted to the vessel maneuvering system, which delivers the requested forces and moments by positioning the independently steerable propulsion devices 12, 14, controlling the power provided to the propellers, impellers, or propulsors of each device, and controlling the thrust vector directions of both propulsion devices 12, 14. One or both of the propulsion devices 12, 14 and their respective power transmission mechanisms 13, 15 can be controlled to null the error elements. The propulsion devices 12, 14 and their respective power transmission mechanisms 13, 15 can also be controlled independently of one another, such that their magnitudes, directions, and/or angles of thrust are different from one another. Such automatic correction of the position and heading of the marine vessel 10 can be achieved according to the principles described in U.S. Pat. No. 7,305,928, which was incorporated by reference herein above.

Figure 6:
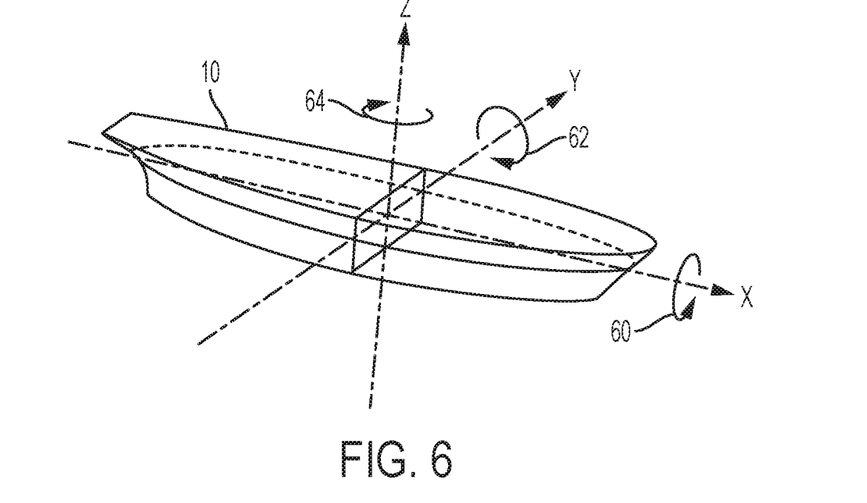
FIG. 6 illustrates the concepts of pitch, roll, and heading of the marine vessel.

With reference to FIG. 6, a marine vessel's attitude can be described by its roll around an x-axis, its pitch around a y-axis, and its yaw around a z-axis. Pitch and roll can be calculated by an angular difference from a horizontal plane defined by the x- and y-axes. A positive roll is around the x-axis in the direction of the arrow 60 shown in FIG. 6. A negative roll is in the opposite direction. A positive pitch is around the y-axis in the direction of the arrow 62 shown in FIG. 6. A negative pitch is in the opposite direction. Heading can be measured from 0 degrees to 360 degrees clockwise, as shown by arrow 64.

Generally, station keeping algorithms are calibrated for a specific set of conditions and do not provide optimal performance under other types of conditions. For example, a control module 16 carrying out a station keeping algorithm may have very little knowledge of the state of the body of water in which the vessel 10 is operating, wherein waves may cause the vessel 10 to pitch back and forth and/or roll side to side. Pitching and rolling cause the vessel 10 to move in ways that are detected by the GPS receiver in the AHRS 19. These intermittent disturbances cause the control module 16 to react to try to compensate for the pitching and rolling movement. In order to provide such compensation, the control module 16 repeatedly turns the propulsion devices' prime mover(s) on or off, shifts the propulsion devices' transmissions to different positions, or otherwise engages or disengages the shafts holding the propellers, impellers, or propulsors from the prime mover(s). All of these changes involve movement of and/or contact between mechanical components, which cause parts to wear and produce noise. Meanwhile, because water roughness conditions tending to cause repeated pitch and roll merely push the vessel 10 away from the target position TP and/or target heading TH and then back toward it, most of this compensatory control results in little improvement to the position and heading control. In the present example, the life of the power transmission mechanisms 13, 15 of the propulsion devices 12, 14 can be increased and noise, vibration, and harshness (NVH) transmitted to the vessel 10 can be optimized by reducing the effects that recurring errors caused by rough water conditions have on the frequency of the propulsion system's corrective control actions.

Figure 7A:
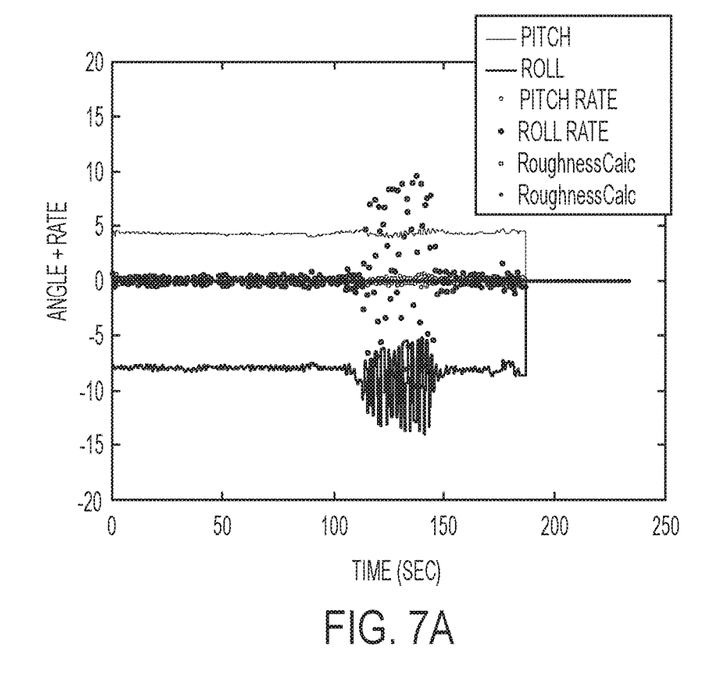
FIGS. 7A-7C illustrate data taken from a vessel when a method of the present disclosure is not used.
Figure 7B:
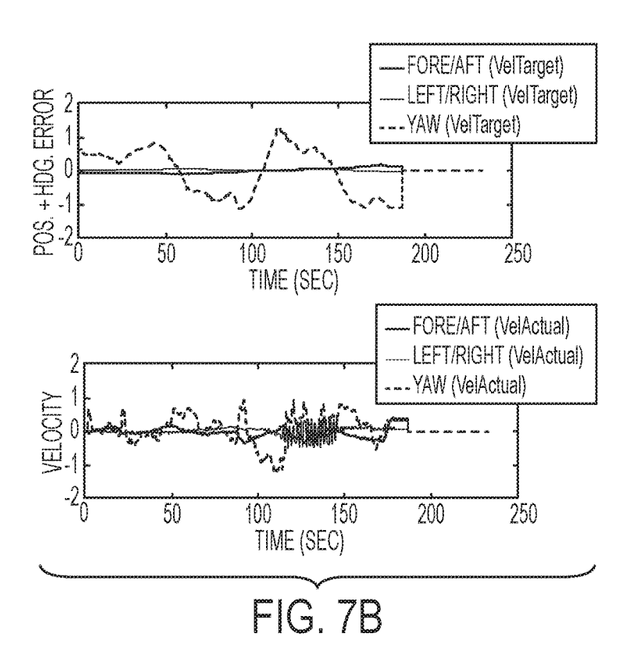
Figure 7C:
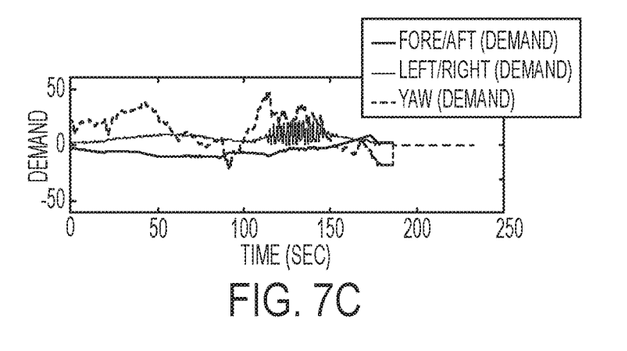

FIGS. 7A-7C illustrate test data taken from a vessel when the method of the present disclosure is not used. In FIG. 7A, roll is induced between 100 and 150 seconds by physically rocking the vessel. As shown in the bottom plot of FIG. 7B, the detected "actual" velocity from the GPS receiver is showing that the vessel is physically moving left to right and right to left over and over. However, the center of gravity of the vessel is not really moving; rather, because the GPS receiver is typically on a lever arm (e.g., on a pole, on top of a cabin) at a distance away from the center of gravity of the vessel, the GPS receiver moves from side-to-side like a pendulum as the vessel 10 rolls. This shows up as left-right movement (e.g., actual velocity, FIG. 7B), even though the vessel is really only rocking side-to-side. The result of this roll is that the station keeping algorithm calculates a target velocity as shown in the top plot of FIG. 7B, and then calculates a left/right compensatory "virtual joystick demand" to null the error between the target and actual velocities, as shown in the plot of FIG. 7C. This demand, or request for compensatory thrust, is very busy because the detected left-right movement requires that the propulsion devices' engine speeds change and their transmissions shift again and again to compensate for the repeated left-right "error" as reported by the GPS receiver.

To reduce such busyness, the system 100 and method 900 of the present disclosure monitor measurements related to the attitude of the marine vessel 10 in a body of water. In the present example, the attitude measurements are vessel pitch measurements and vessel roll measurements, which are obtained by the AHRS 19. The control module 16 uses this information to estimate roughness conditions on the body of water. The roughness conditions are then used as inputs to gain tables and position holding deadband and hysteresis tables that are used by the feedback controller 17. The control module 16 thereby automatically modifies the feedback control given the roughness conditions and provides better, less busy control under many different operating conditions.

Figure 2A:
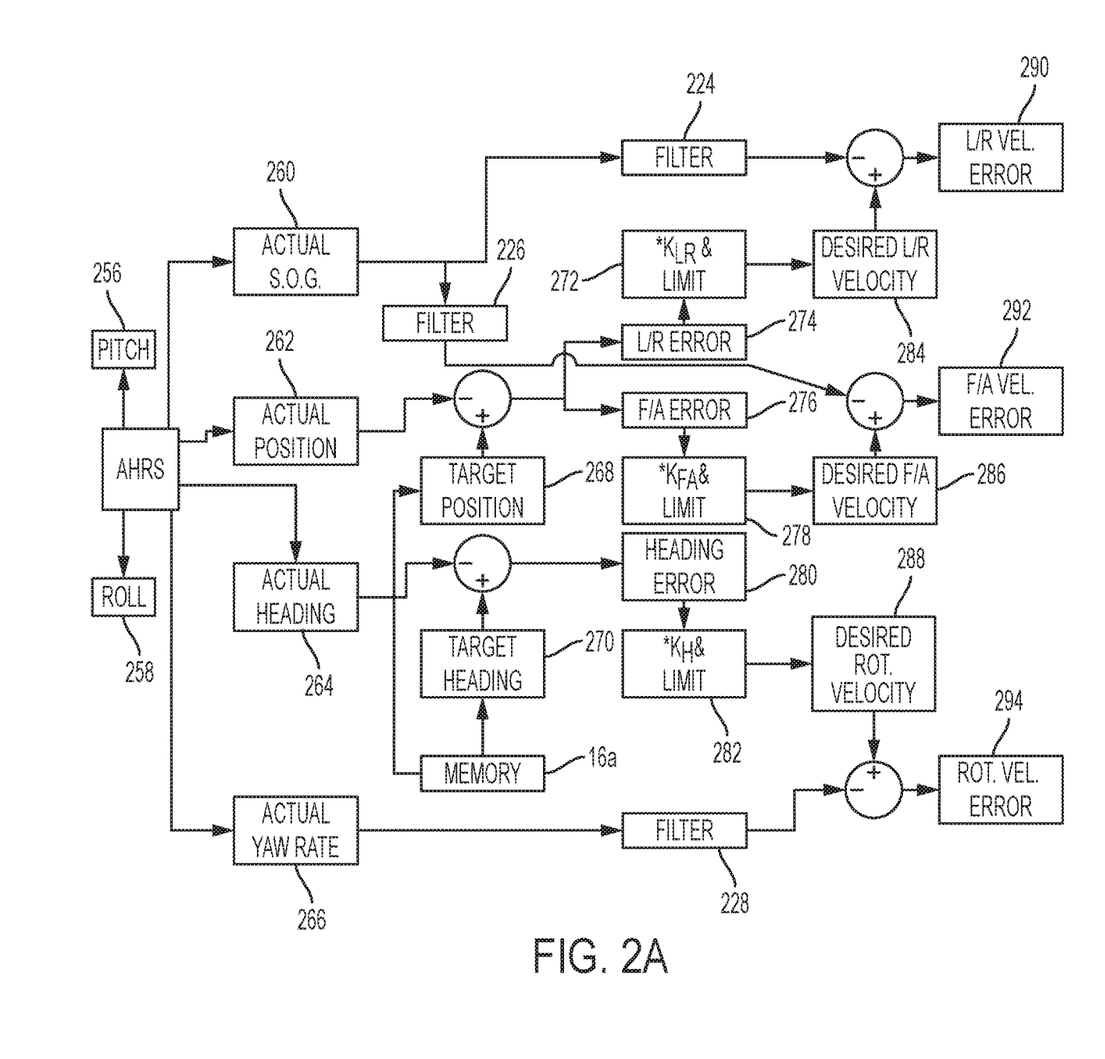
FIGS. 2A and 2B illustrate a schematic of a control algorithm for a station keeping method according to the present disclosure.
Figure 2B:
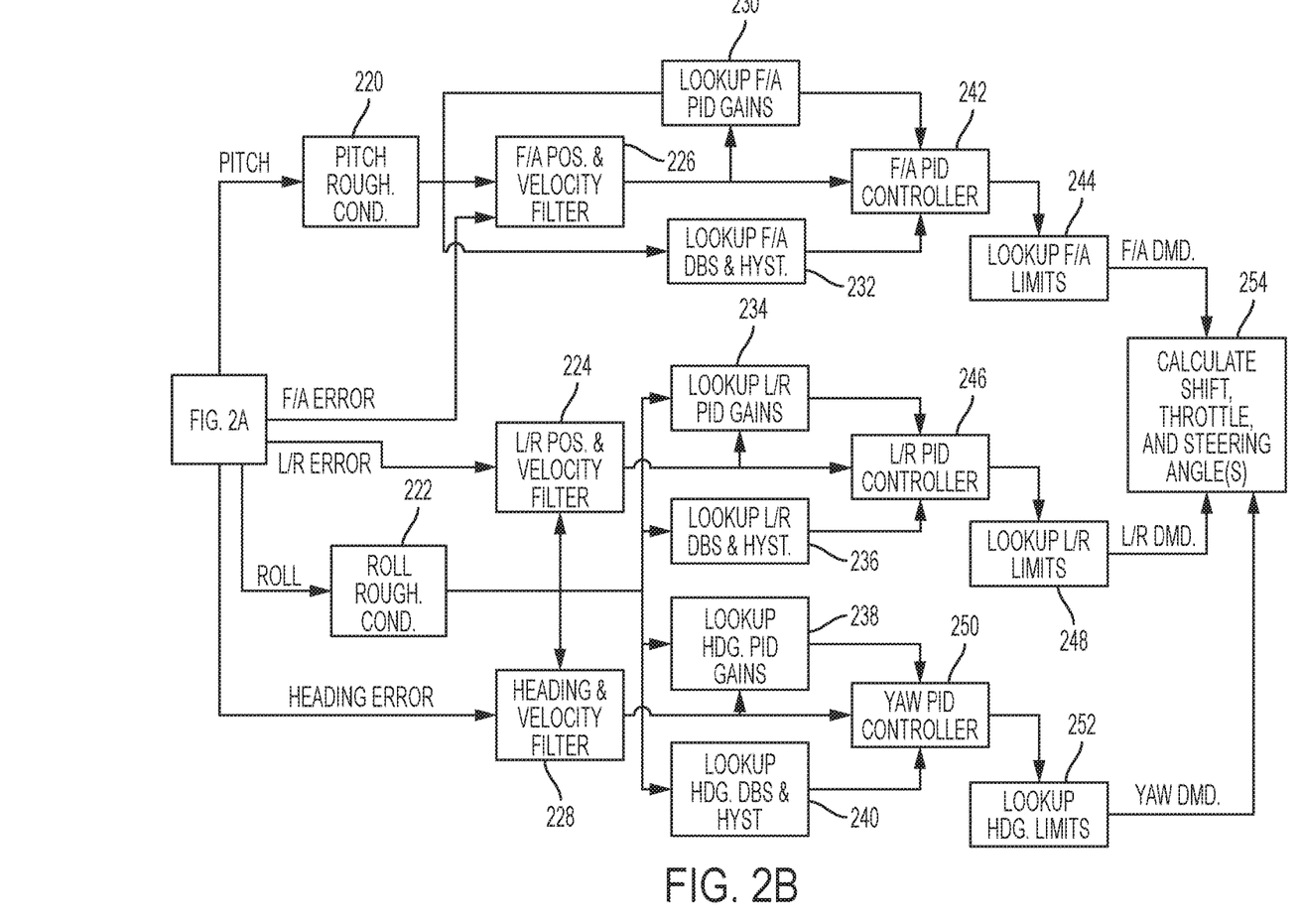

FIGS. 2A and 2B schematically illustrate the station keeping algorithms performed by the control module 16. Referring to FIG. 2A, the AHRS 19 provides vessel pitch measurements at 256 and vessel roll measurements at 258 to the control module 16. The AHRS 19 also determines the actual position 262, actual heading 264, actual speed over ground (linear velocity) 260, and actual yaw rate (rotational velocity) 266 of the vessel 10. Using this information from the AHRS 19, the control module 16 determines position and heading error with respect to a predetermined target position and heading from the storage system 16a along three axes: fore-aft, left-right, and yaw. For example, the control module 16 determines at least one of a difference between a measured (actual) global position 262 and a preselected (target) global position 268 and a difference between a measured (actual) heading 264 and a preselected (target) heading 270, such as each of a left-right position error 74, fore-aft position error 276, and heading error 280. Next, the control module 16 calculates at least one of a desired linear velocity (for example, left-right desired velocity 284 and fore-aft desired velocity 286) based on the position difference(s) 274, 276, and a desired rotational velocity 288 based on the heading difference 280. The control module 16 may multiply the left-right position error 274, fore-aft position error 276, and heading error 280 by respective calibrated constants and send the results through a limiter (see 272, 278, 282) to calculate each respective desired velocity: left/right desired velocity 284, fore/aft desired velocity 286, and desired rotational velocity 288.

As shown in FIG. 2B, the pitch measurements 256 are sent to a pitch roughness condition estimator 220 and the roll measurements 258 are sent to a roll roughness condition estimator 222. Based on the pitch measurements 256 and the roll measurements 258, the control module 16 filters at least one of the actual linear velocity (SOG 260) of the marine vessel 10 and the actual rotational velocity (yaw rate 266) of the marine vessel 10. More specifically, the left-right position error 274 and the left-right velocity (from SOG 260) are sent to a left-right position and velocity filter 224, which uses the left-right position error 274, the left-right velocity, and the roll roughness condition estimate from the roll roughness condition estimator 222 to determine left-right position error and left-right velocity that are compensated for recurring roll. The fore-aft position error 276 and the fore-aft velocity (from SOG 260) are sent to a fore-aft position and velocity filter 226, which uses the fore-aft position error 276, the fore-aft velocity, and the pitch roughness condition estimate from the pitch roughness condition estimator 220 to determine fore-aft position error and fore-aft velocity that are compensated for recurring pitch. The heading error 280 and yaw rate 266 are sent to a heading and heading velocity filter 228, which uses the heading error 280, yaw rate 266, and the roll roughness condition estimate from the roll roughness condition estimator 222 to determine heading error and yaw rate that are compensated for recurring roll.

The position and velocity filters 224, 226 and the heading and heading velocity filter 228 filter out the noise created by the recurring error that is measured as the vessel 10 pitches back and forth or rolls side-to-side. Applying a filter to the fore-aft position error 276 and fore-aft velocity (from SOG 260), left-right position error 274 and left-right velocity (from SOG 260), and heading error 280 and yaw rate 266 filters out noise in the signal from the AHRS 19 and allows changes in left-right, fore-aft, and heading errors to be caught as they occur. Each filter 224, 226, 228 may be a type of moving average filter, which averages the current fore-aft, left-right, or heading error and a predetermined number of past fore-aft, left-right, or heading errors. In one example, each filter 224, 226, 228 is a first order exponential filter. The first order exponential filters may operate according to the equation: y(k)=a*y(k−1)+(1−a)*x(k), where x(k) is the raw input at time step k; y(k) is the filtered output at time step k; and "a" is a constant between 0 and 1. In one example, a=exp (−T/τ), where τ is the filter time constant, and T is a fixed time step between samples. The value of "a" for the fore-aft, left-right, or heading error filter can be determined based on the value of the raw fore-aft, left-right, or heading error, respectively. In other examples, the filters 224, 226, 228 could be median filters, mode filters, or Hampel filters.

The roll roughness condition estimate from estimator 222 may be provided to the heading and heading velocity filter 228, as shown in the example of FIG. 2B, in the case that heading of a particular vessel is more affected by recurring roll than by recurring pitch. Alternatively, the pitch roughness condition estimate from estimator 220 may be used as an input to the heading and heading velocity filter 228, depending on the type of vessel. In another example, the higher of the pitch roughness condition estimate or the roll roughness condition estimate is used as the input to the heading and heading velocity filter 228.

The pitch roughness condition estimate from estimator 220 is used as an input to an input-output map, such as a lookup table 230, to look up fore-aft PID gains as a function of fore-aft error (here, filtered fore-aft position error) and the pitch roughness condition estimate. The pitch roughness condition estimate is also used as an input to an input-output map, such as a lookup table 232, to look up fore-aft deadband and hysteresis values as a function of the pitch roughness condition estimate. The roll roughness condition estimate from estimator 222 is used as an input to an input-output map, such as a lookup table 234, to look up left-right PID gains as a function of left-right error (here, filtered left-right position error) and the roll roughness condition estimate. The roll roughness condition estimate is also used as an input to an input-output map, such as a lookup table 236, to look up left-right deadband and hysteresis values as a function of the roll roughness condition estimate. The roll roughness condition estimate is also used as an input to an input-output map, such as a lookup table 238, to look up heading PID gains as a function of heading error (here, filtered heading error) and the roll roughness condition estimate. The roll roughness condition estimate is also used as an input to an input-output map, such as a lookup table 240, to look up heading deadband and hysteresis values as a function of the roll roughness condition estimate.

The hysteresis values looked up in tables 232, 236, and 240 are used to determine what errors will be nulled by the PID feedback controller 17. The control module 16 sets the position error (for example, left-right error 274 and/or fore-aft error 276), and thus the desired linear velocity (for example, left-right linear velocity 284 and/or fore-aft linear velocity 286), to zero in response to the position difference being inside a predefined position difference hysteresis band. Similarly, the control module 16 sets the heading error 280, and thus the desired rotational velocity 288, to zero in response to the heading difference being inside a predefined heading difference hysteresis band. Each set of hysteresis values is unique, and a particular axis (fore-aft, left-right, or yaw) can be independently zeroed from the other axes. Any non-zeroed errors (i.e., errors that are outside their respective hysteresis bands) are then nulled by the PID controllers 242, 246, 250. The hysteresis value lookup tables 232, 236, and 240 can be implemented in different ways. In one example, hysteresis value lookup table 232 includes separate lookup tables for each of a fore-aft error minimum value and a fore-aft error maximum value, between which the fore-aft error will be zeroed. Hysteresis value lookup table 236 may contain separate tables for each of a left-right error minimum value and a left-right error maximum value between which the left-right error will be zeroed. Similarly, hysteresis value lookup table 240 may contain separate tables for each of a heading error minimum value and a heading error maximum value between which the heading error will be zeroed. In another example, a single table could return both minimum and maximum values for the respective fore-aft, left-right, or heading error hysteresis values.

Referring back to FIG. 2A, the control module 16 then determines at least one of a difference 290, 292 between the desired linear velocity 284, 286 and the filtered actual linear velocity (from filters 224, 226; see also FIG. 2B) and a difference 294 between the desired rotational velocity 288 and the filtered actual rotational velocity (from filter 228; see also FIG. 2B) and calculates marine vessel movements that will minimize the at least one of the linear velocity difference (left-right velocity error 290 and/or fore-aft velocity error 292) and the rotational velocity difference 294. In the example of the present disclosure, the control module 16 calculates the marine vessel movements that will minimize the at least one of the linear velocity difference 290, 292 and the rotational velocity difference 294 using a proportional, integral, derivative (PID) control algorithm.

More specifically, referring to FIG. 2B, the filtered fore-aft position error and fore-aft velocity, the fore-aft PID gains, and the fore-aft deadband and hysteresis values are sent to a fore-aft PID controller 242, the output of which may be limited by a limiter 244 based on fore-aft error and heading error. The filtered left-right position error and left-right velocity, the left-right PID gains, and the left-right deadband and hysteresis values are sent to a left-right PID controller 246, the output of which may be limited by a limiter 248 based on left-right error and heading error. The filtered heading error and yaw rate, the heading PID gains, and the heading deadband and hysteresis values are sent to a heading (yaw) PID controller 250, the output of which may be limited by a limiter 252 based on heading error and distance error (i.e., distance to the target position). Note that although three separate PID controllers 242, 246, and 250 are shown in FIG. 2B, the algorithm could instead be performed by a single PID controller that nulls each of the fore-aft, left-right, and yaw errors at once. Similarly, the limits imposed by the limiters 244, 248, and 252 could be imposed by a single set of PID limits.

In the present example, a fore-aft demand from the limiter 244, a left-right demand from the limiter 248, and a yaw demand from the limiter 252 are then sent to a module 254 that uses these demands as a virtual joystick request to calculate shift positions, throttle positions, and steering angles for the propulsion devices 12, 14 and send commands to the propulsion devices 12, 14 in view of same. In this manner, the control module 16 causes the marine propulsion system 11 to operate to carry out the calculated marine vessel movements. In one example, the control module 16 causes the marine propulsion system 11 to operate to carry out the calculated marine vessel movements in response to the calculated marine vessel movements being outside of a predetermined deadband. For example, the movement required of the marine vessel 10 in the fore-aft direction may be required to be outside a fore-aft demand deadband, for example determined from lookup table 232, before the control module 16 will command the propulsion system 11 to carry out that movement. A similar left-right demand deadband may be determined from the lookup table 236, and a heading demand deadband determined from lookup table 240. In one example, the deadbands for the left-right and heading corrections are greater than those for the fore/aft corrections, as generally a vessel that is not as wide as it is long will tend to roll more easily than it will pitch.

Ordinating the above-mentioned control tables 230, 232, 234, 236, 238, 240 off of the roughness condition metrics (the pitch roughness condition estimate and the roll roughness condition estimate) allows one calibration to handle both calm water conditions and rough water conditions. For example, the deadbands in tables 232, 236, and 240 might be greater (wider) when conditions on the body of water are determined to be rougher, thereby allowing the vessel 10 to be pushed around more back-and-forth or side-to-side, while on average staying in the same spot. Additionally, it may be desirable to have PID gains in tables 230, 234, and 238 be low when conditions on the body of water are calm, but higher when conditions on the body of water are rough, when more authority is required to counteract the high external forces acting on the vessel 10.

Figures 3, 4:
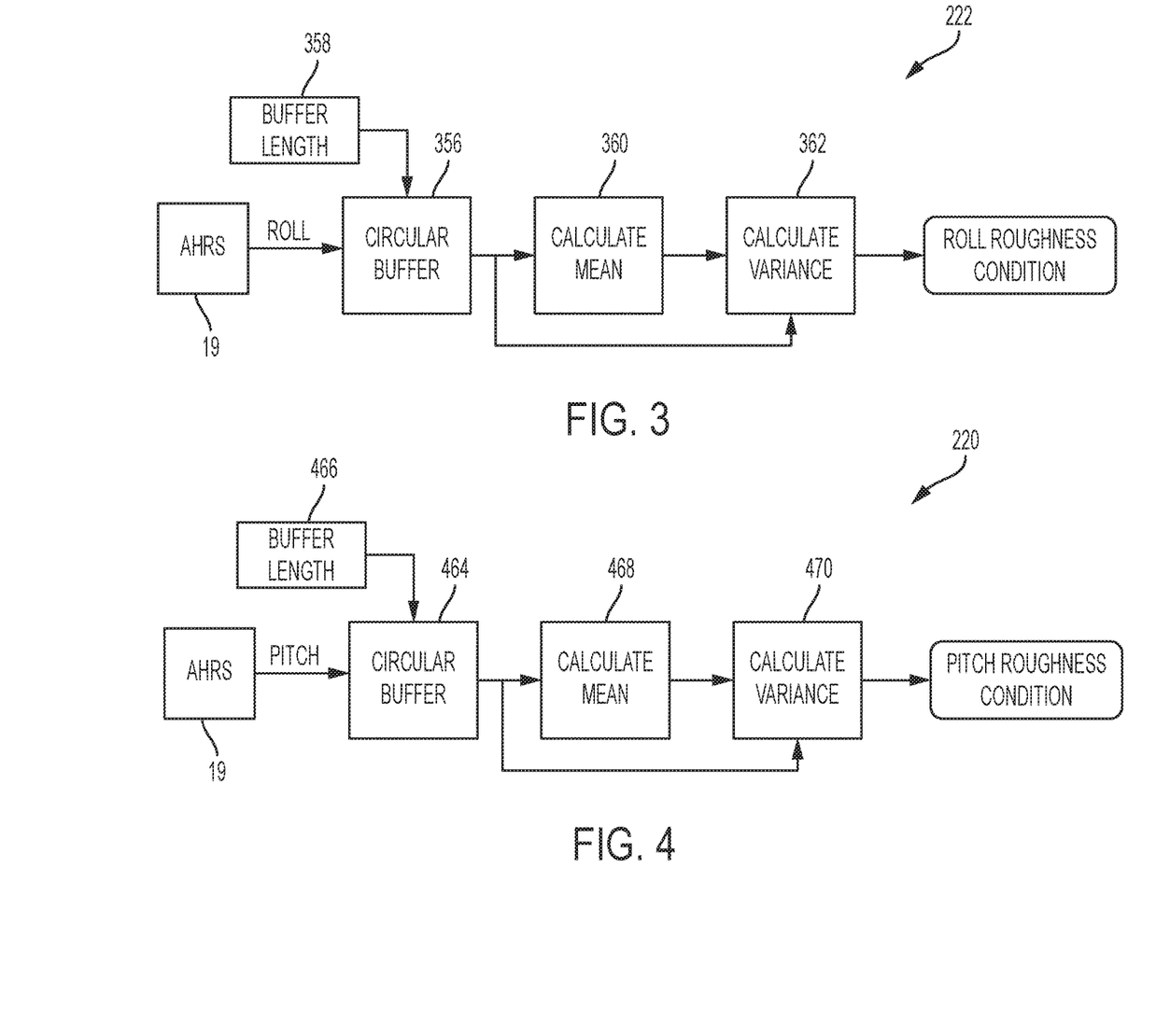
FIGS. 3 and 4 schematically illustrate more detail of portions of the algorithm shown in FIGS. 2A and 2B.

FIGS. 3 and 4 show one example of algorithms the pitch roughness condition estimator 220 and the roll roughness condition estimator 222 might use, which effectively calculate standard deviations of the measured pitch and roll. As shown in FIG. 3, the roll measured by the AHRS 19 is sent to the roll roughness condition estimator 222, which uses an adjustable length circular buffer 356, the length of which can be set by a buffer length input 358. In one example, the buffer length is N data points long, where a data point is taken every predetermined time unit. Next, the mean of the data in the buffer 356 is determined by a mean calculator 360. The data in the buffer 356 and the buffer mean are then used by a variance calculator 362 to calculate the variance of the data in the circular buffer 356. The variance is output as the roll roughness condition estimate to the left-right position and velocity error filter 224, the heading and heading velocity error filter 228, the PID gains look up tables 234, 238, and the deadband lookup tables 236, 240 (FIG. 2B).

Turning to FIG. 4, the pitch measured by the AHRS 19 is sent to the pitch roughness condition estimator 220, which uses an adjustable length circular buffer 464, the length of which can be set by a buffer length input 466. In one example, the buffer length is N data points long, where a data point is taken every predetermined time unit. Next, the mean of the data in the buffer 464 is determined by a mean calculator 468. The data in the buffer 464 and the buffer mean are then used by a variance calculator 470 to calculate the variance of the data in the circular buffer 464. The variance is output as the pitch roughness condition estimate to the fore-aft position and velocity error filter 226, the PID gains look up table 230, and the fore-aft deadband lookup table 232 (FIG. 2B).

In the examples of FIGS. 3 and 4, the control module 16 estimates the roughness conditions by calculating a variance of the pitch measurements and a variance of the roll measurements. In another example, both the variance calculator 362 and the variance calculator 470 output the standard deviations of the respective buffers 356, 464 as the roughness condition estimates, rather than the variances. Note that in some applications it may be desirable to use the variances instead of the standard deviations, which former option is less computationally intensive because it does not require taking a square root.

The value of "N" for the buffer length affects the system's sensitivity to error. Lower values of "N" will make the system 100 more sensitive, but also more noisy, because the roughness calculation will be less accurate, as there is less data for calculating the mean and the variance. Higher values of "N" will make the system less sensitive, but more accurate, because there will be more data available for calculating the mean and the variance. The buffer lengths may be set during calibration and may or may not be modifiable by the operator via the input source 18.

In the present example, the control module 16 stores the pitch measurements and the roll measurements in respective circular buffers 356, 464 in the storage system 16b of the control module 16. A circular buffer is used at 356 and 464 to calculate the roughness condition estimates/metrics so that the metrics are based on the roughness conditions at the time the values of pitch and roll are measured. Thus, the roughness condition metrics are calculated continuously. In contrast, the buffers could be non-circular. This alternative method uses a calibrated length of recorded data to calculate the mean and standard deviation, and requires that all of the pitch and roll data be recorded before calculating the roughness condition metrics. This may lead to discrete step responses in control behavior because the buffers do not include up-to-date data points. The circular buffers 356, 464, in contrast, result in smooth control, with fewer discontinuities that are noticeable to those present on the vessel 10. Nonetheless, a non-circular buffer may be preferred in some instances when a lower throughput is desired, as the calculations are executed less frequently.

Thus, the control module 16 calculates a variance of the pitch measurements 256 and a variance of the roll measurements 258 (i.e., the roughness conditions) and filters the at least one of the actual linear velocity (SOG 260) and the actual rotational velocity (yaw rate 266) based on the variance of the pitch measurements and the variance of the roll measurements (i.e., the roughness conditions). As noted with respect to filters 224, 226, and 228 of FIGS. 2A and 2B, the control module 16 filters at least one of the position difference 274, 276 and the heading difference 280 based on the variance of the pitch measurements and the variance of the roll measurements. The control module 16 may then calculate the at least one of the desired linear velocity 284, 286 based on the filtered position difference, and the desired rotational velocity 288 based on the filtered heading difference. As noted with respect to filter 226, the control module 16 filters a fore/aft component of the position difference and a fore/aft component of the linear velocity based on the variance of the pitch measurements. As noted with respect to filter 224, the control module 16 filters a left/right component of the position difference and a left/right component of the linear velocity based on the variance of the roll measurements. As noted with respect to filter 228, the control module 16 filters the heading difference and the rotational velocity based on the variance of the roll measurements.

Additionally, as described with respect to lookup tables 232, 236, and 240, the control module 16 determines the position difference hysteresis band and the heading difference hysteresis band based on the variance of the pitch measurements and the variance of the roll measurements (i.e., roughness conditions). As described with respect to lookup tables 230, 234, and 238, the control module 16 also determines at least one of a proportional gain, a derivative gain, and an integral gain for use in the PID control algorithm(s) based on the variance of the pitch measurements and the variance of the roll measurements (i.e., the roughness conditions).

Figure 8A:
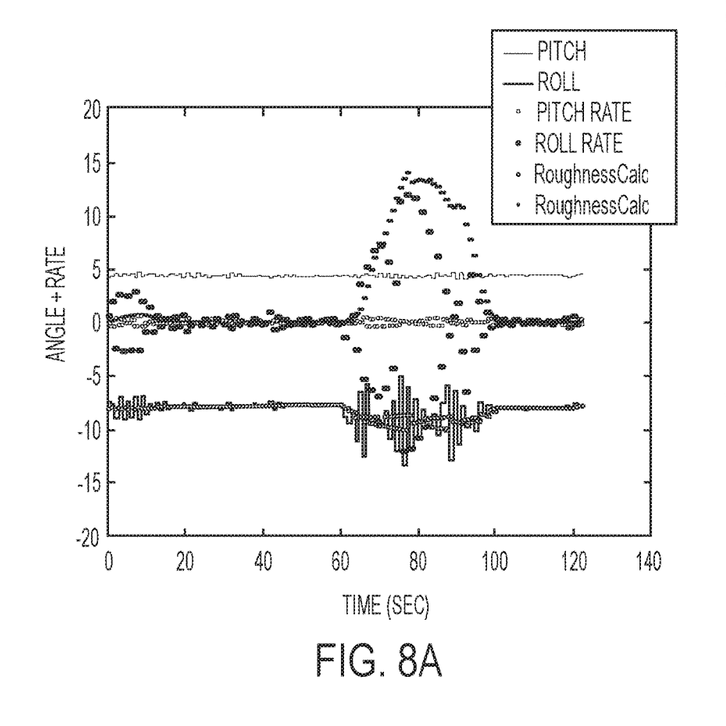
FIGS. 8A-8C illustrate data taken from a vessel when a method of the present disclosure is implemented.
Figure 8B:
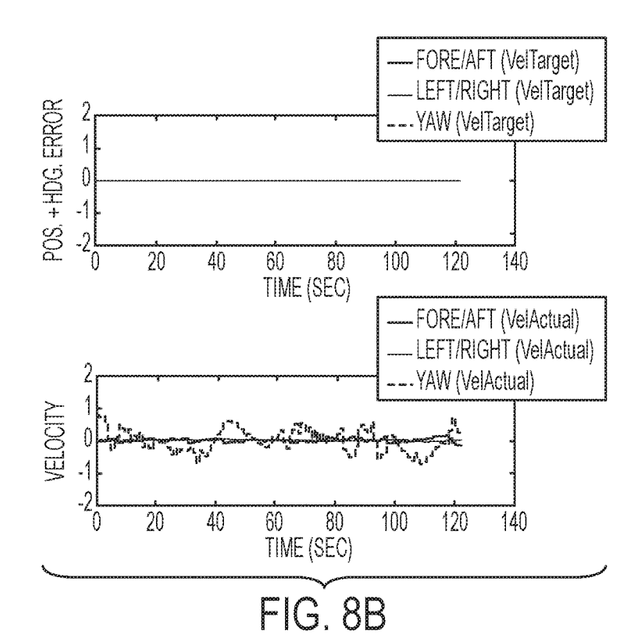
Figure 8C:
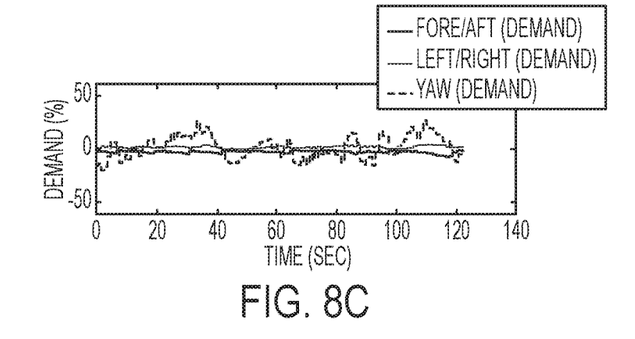

FIGS. 8A-8C illustrate test data taken from a vessel 10 when the method of the present disclosure is implemented. In FIG. 8A, roll is induced between 60 and 100 seconds by rocking the vessel 10. The dots on the upper portion of the plot are the calculated roll roughness values. This is a rolling average calculation, as described herein above with respect to the adjustable length buffer 356 and variance calculator 362 of FIG. 3. FIG. 8B shows how the left/right target velocity (upper plot) is zero and the difference between the filtered actual velocity (lower plot) and the target velocity that the feedback controller 17 sees is relatively constant and has little noise due to implementation of the present algorithm (compare FIG. 7B). Because the actual velocity measurement is the control step between position error calculation and demand calculation, the demand then also will not oscillate. Thus, it can be seen from FIG. 8C that the left/right virtual joystick demand does not oscillate as it did in FIG. 7C, due to the present gain scheduling and deadband adjustments based on the calculated roughness metric (here, the roll roughness condition estimate).

Although comparison of FIGS. 7A-7C with FIGS. 8A-8C shows an example of how recurring roll can be filtered out of the station keeping algorithm, note that the same results would occur if the vessel were pitching back and forth. In other words, not only will the present algorithm result in a left/right demand that does not oscillate with recurring roll, it will also result in a fore/aft demand that does not oscillate with recurring pitch. Additionally, the roughness condition metrics will filter out any recurring rotational error that is measured, such that yaw demand will not oscillate either.

Figure 9:
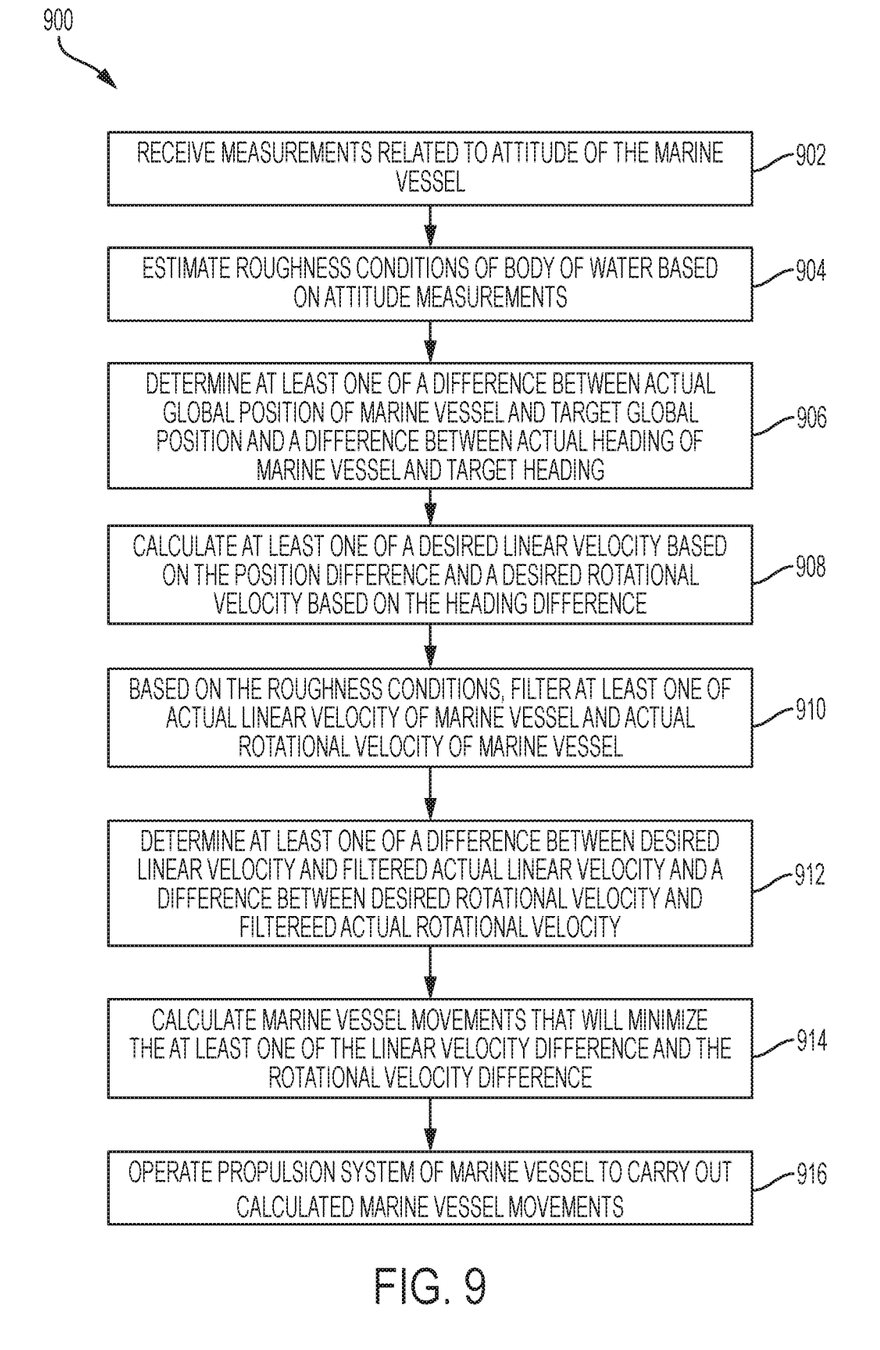
FIG. 9 illustrates an example of a method according to the present disclosure.

A method 900 for maintaining a marine vessel 10 at at least one of a target global position TP and a target heading TH in a body of water according to one example of the present disclosure is shown in FIG. 9. The method is carried out by a control module 16. As shown at box 902, the method includes receiving measurements related to an attitude of the marine vessel 10. As shown at box 904, the method next includes estimating roughness conditions of the body of water based on the attitude measurements. As shown at box 906, the method includes determining at least one of a difference between an actual global position AP of the marine vessel 10 and the target global position TP and a difference between an actual heading AH of the marine vessel 10 and the target heading TH. As shown at box 908, the method then includes calculating at least one of a desired linear velocity based on the position difference and a desired rotational velocity (i.e., yaw rate) based on the heading difference. As shown at box 910, based on the roughness conditions, the method includes filtering at least one of an actual linear velocity of the marine vessel 10 and an actual rotational velocity of the marine vessel 10. As shown at box 912, the method includes determining at least one of a difference between the desired linear velocity and the filtered actual linear velocity and a difference between the desired rotational velocity and the filtered actual rotational velocity. As shown at box 914, the method also includes calculating marine vessel movements that will minimize the at least one of the linear velocity difference and the rotational velocity difference. Next, as shown at box 916, the method includes operating a propulsion system 11 of the marine vessel 10 to carry out the calculated marine vessel movements.

As described herein above, the present inventors realized that slowing the station keeping system down and adding deadbands when in a disturbed environment could reduce "virtual joystick demand" busyness. By filtering out the GPS position and velocity feedback as a function of measured roughness conditions on a body of water, recurring roll or pitch disturbances can be prevented from being fed into the feedback controller 17. Because the GPS filtering is done using gain scheduling as a function of the measured roughness condition, vessel movements in calm conditions are not falsely damped out. The system and method of the present disclosure provide the ability for the control module 16 to monitor external roughness conditions accurately and to adjust its calibration to improve control system performance. The roughness conditions prediction algorithm can be running in the background even before the station keeping mode is requested, which pre-fills the buffers 356, 464 with data points. The present roughness condition metrics could also be used to filter out pitch, roll, and/or yaw noise when the vessel 10 is porpoising, when the vessel 10 is in an auto-heading mode or a waypoint tracking mode, or in a trim control mode. A roughness condition metric based on heading may also be determined, in other examples, and used to tune out wander while in auto-heading or waypoint tracking mode.

In the above description, certain terms have been used for brevity, clarity, and understanding. No unnecessary limitations are to be inferred therefrom beyond the requirement of the prior art because such terms are used for descriptive purposes and are intended to be broadly construed. The order of method steps or decisions shown in the Figures and described herein are not limiting on the appended claims unless logic would dictate otherwise. It should be understood that the decisions and steps can be undertaken in any logical order and/or simultaneously. The different systems and methods described herein may be used alone or in combination with other systems and methods. It is to be expected that various equivalents, alternatives and modifications are possible within the scope of the appended claims. Each limitation in the appended claims is intended to invoke interpretation under 35 U.S.C. § 112(f), only if the terms "means for" or "step for" are explicitly recited in the respective limitation.

What is claimed is:

1. A method for maintaining a marine vessel at a target global position and a target heading in a body of water, the method being carried out by a control module and comprising:
    receiving measurements related to an attitude of the marine vessel;
    estimating roughness conditions of the body of water based on the attitude measurements;
    determining a difference between an actual global position of the marine vessel and the target global position and a difference between an actual heading of the marine vessel and the target heading;
    calculating a desired linear velocity based on the position difference and a desired rotational velocity based on the heading difference;
    based on the roughness conditions, filtering an actual linear velocity of the marine vessel and an actual rotational velocity of the marine vessel;
    determining a difference between the desired linear velocity and the filtered actual linear velocity and a difference between the desired rotational velocity and the filtered actual rotational velocity;
    calculating marine vessel movements that will minimize the linear velocity difference and the rotational velocity difference; and
    operating a propulsion system of the marine vessel to carry out the calculated marine vessel movements.

2. The method of claim 1, wherein the attitude measurements are vessel pitch measurements and vessel roll measurements.

3. The method of claim 2, further comprising estimating the roughness conditions by calculating a variance of the pitch measurements and a variance of the roll measurements.

4. The method of claim 3, further comprising storing the pitch measurements and the roll measurements in respective circular buffers in a storage system of the control module.

5. The method of claim 3, further comprising filtering the position difference and the heading difference based on the roughness conditions; and
    calculating the desired linear velocity based on the filtered position difference and the desired rotational velocity based on the filtered heading difference.

6. The method of claim 5, further comprising filtering a fore/aft component of the position difference and a fore/aft component of the actual linear velocity based on the variance of the pitch measurements; and
    filtering a left/right component of the position difference and a left/right component of the actual linear velocity based on the variance of the roll measurements.

7. The method of claim 6, further comprising filtering the heading difference and the actual rotational velocity based on the variance of the roll measurements.

8. The method of claim 1, further comprising setting the desired linear velocity to zero in response to the position difference being inside a predefined position difference hysteresis band; and
    setting the desired rotational velocity to zero in response to the heading difference being inside a predefined heading difference hysteresis band.

9. The method of claim 8, further comprising determining the position difference hysteresis band and the heading difference hysteresis band based on the roughness conditions.

10. The method of claim 1, further comprising calculating the marine vessel movements that will minimize the linear velocity difference and the rotational velocity difference using a proportional, integral, derivative (PID) control algorithm; and
    determining at least one of a proportional gain, a derivative gain, and an integral gain for use in the PID control algorithm based on the roughness conditions.

11. The method of claim 1, further comprising carrying out the calculated marine vessel movements in response to the calculated marine vessel movements being outside of a predetermined deadband.

12. A system for maintaining a marine vessel at a preselected global position and a preselected heading, the system comprising:
    a control module in signal communication with a propulsion system of the marine vessel;
    a pitch sensor that provides vessel pitch measurements to the control module;
    a roll sensor that provides vessel roll measurements to the control module;
    a heading sensor that provides a measured heading of the marine vessel to the control module; and
    a position sensor that provides a measured global position of the marine vessel to the control module;
    wherein the control module determines a difference between the measured global position and the preselected global position and a difference between the measured heading and the preselected heading;
    wherein the control module calculates a desired linear velocity based on the position difference and a desired rotational velocity based on the heading difference;
    wherein, based on at least one of the pitch measurements and the roll measurements, the control module filters an actual linear velocity of the marine vessel and an actual rotational velocity of the marine vessel;
    wherein the control module determines a difference between the desired linear velocity and the filtered actual linear velocity and a difference between the desired rotational velocity and the filtered actual rotational velocity; and
    wherein the control module calculates marine vessel movements that will minimize the linear velocity difference and the rotational velocity difference and causes the propulsion system to operate to carry out the calculated marine vessel movements.

13. The system of claim 12, wherein the control module calculates a variance of the pitch measurements and a variance of the roll measurements and filters the actual linear velocity and the actual rotational velocity based on at least one of the variance of the pitch measurements and the variance of the roll measurements.

14. The system of claim 13, wherein the control module filters the position difference and the heading difference based on at least one of the variance of the pitch measurements and the variance of the roll measurements; and
   wherein the control module calculates the desired linear velocity based on the filtered position difference and the desired rotational velocity based on the filtered heading difference.

15. The system of claim 14, wherein the control module filters a fore/aft component of the position difference and a fore/aft component of the actual linear velocity based on the variance of the pitch measurements; and
   wherein the control module filters a left/right component of the position difference and a left/right component of the actual linear velocity based on the variance of the roll measurements.

16. The system of claim 15, wherein the control module filters the heading difference and the actual rotational velocity based on the variance of the roll measurements.

17. The system of claim 13, wherein the control module sets the desired linear velocity to zero in response to the position difference being inside a predefined position difference hysteresis band; and
   wherein the control module sets the desired rotational velocity to zero in response to the heading difference being inside a predefined heading difference hysteresis band.

18. The system of claim 17, wherein the control module determines the position difference hysteresis band and the heading difference hysteresis band based on at least one of the variance of the pitch measurements and the variance of the roll measurements.

19. The system of claim 13, wherein the control module calculates the marine vessel movements that will minimize the linear velocity difference and the rotational velocity difference using a proportional, integral, derivative (PID) control algorithm; and
   wherein the control module determines at least one of a proportional gain, a derivative gain, and an integral gain for use in the PID control algorithm based on the variance of the pitch measurements and the variance of the roll measurements.

20. The system of claim 12, wherein the control module causes the propulsion system to operate to carry out the calculated marine vessel movements in response to the calculated marine vessel movements being outside of a predetermined deadband.

* * * * *